United States Patent
Wu et al.

(10) Patent No.: US 9,025,901 B2
(45) Date of Patent: May 5, 2015

(54) EMBEDDED SYSTEM USING IMAGE CODING METHOD

(71) Applicant: National Chiao Tung University, Hsinchu (TW)

(72) Inventors: Bing-Fei Wu, Hsinchu (TW); Yen-Lin Chen, Kaohsiung (TW); Hao-Yu Huang, Kaohsiung (TW)

(73) Assignee: National Chiao Tung University, Hsinchu (TW)

( * ) Notice: Subject to any disclaimer, the term of this patent is extended or adjusted under 35 U.S.C. 154(b) by 121 days.

(21) Appl. No.: 13/898,968

(22) Filed: May 21, 2013

(65) Prior Publication Data

US 2014/0212060 A1    Jul. 31, 2014

(30) Foreign Application Priority Data

Jan. 29, 2013   (TW) .............................. 102103279 A

(51) Int. Cl.
*G06K 9/46* (2006.01)
*H04N 19/176* (2014.01)
*H04N 19/12* (2014.01)
*H04N 19/14* (2014.01)

(52) U.S. Cl.
CPC ............ *G06K 9/4642* (2013.01); *H04N 19/176* (2014.11); *H04N 19/12* (2014.11); *H04N 19/14* (2014.11); *G06K 9/4604* (2013.01)

(58) Field of Classification Search
USPC .......................................................... 382/250
See application file for complete search history.

(56) References Cited

U.S. PATENT DOCUMENTS

| | | | |
|---|---|---|---|
| 6,226,414 B1* | 5/2001 | Go ................................. | 382/240 |
| 8,180,112 B2* | 5/2012 | Kurtz et al. .................... | 382/108 |
| 2009/0154565 A1* | 6/2009 | Jeong et al. ............... | 375/240.16 |
| 2014/0212060 A1* | 7/2014 | Wu et al. ....................... | 382/250 |
| 2015/0015581 A1* | 1/2015 | Lininger ....................... | 345/426 |

* cited by examiner

*Primary Examiner* — Gregory M Desire
(74) *Attorney, Agent, or Firm* — Tim Tingkang Xia, Esq.; Morris, Manning & Martin, LLP

(57) ABSTRACT

An image coding method including constructing a plurality of edge models with a Forward Discrete Cosine Transform (FDCT) algorithm; creating adjustment equations each matching one of the edge models; capturing an image comprising pixels; selecting the pixels of the image to define image blocks; detecting by block-edge detection (BED) a pattern collectively exhibited by the pixels in the each of the image blocks and then comparing the detected pattern with patterns of the edge models; changing the patterns of the image blocks to the patterns of the edge models and adjusting the dominating coefficient by the adjustment factor after determining that the patterns of the image blocks approximate to the patterns of the edge models; and performing a coding process on the edge models by LLEC to generate a compressed image corresponding to the edge models. An embedded system is applicable to the image coding method.

12 Claims, 4 Drawing Sheets

(a)

(b)

(c)

(d)

(e)

EMBEDDED SYSTEM USING IMAGE CODING METHOD

CROSS-REFERENCE TO RELATED APPLICATION

This non-provisional application claims priority under 35 U.S.C. §119(a) on Patent Application No(s). 102103279 filed in Taiwan, R.O.C. on Jan. 29, 2013, the entire contents of which are hereby incorporated by reference.

FIELD OF THE INVENTION

The present invention relates to image coding methods and systems using the same, and more particularly, to an image coding method which combines the schemes of Block-Edge Detection (BED) and Low-Complexity and Low-Memory Entropy Coder (LLEC), and an embedded system using the image coding method.

BACKGROUND OF THE INVENTION

Transform coding plays an important role in conventional image compression. The purpose of transform coding is to reduce redundant data created during the image compression process. At present, the transform coding entails performing Discrete Cosine Transform (DCT). For instance, image compression standards, such as JPEG, JPEG2000, MPEG-1/2, MPEG4, H.263, and H.264/AVC, apply DCT.

Although the image compression standards achieve high-quality image compression by means of DCT, DCT has a limitation, that is, image compression cannot be accomplished by means of DCT without personal computers operating at a high processing speed and having a large-capacity memory.

However, unlike the personal computers, embedded systems with a low processing speed and a small-capacity memory are unable to perform DCT efficiently. Hence, with the embedded systems being subject to hardware requirements, the embedded systems are unable to compress the image efficiently.

Accordingly, it is imperative to put forth a method and system for overcoming the aforesaid drawbacks of the prior art.

SUMMARY OF THE INVENTION

It is an objective of the present invention to provide an image coding method that combines the schemes of Block-Edge Detection (BED) and Low-Complexity and Low-Memory Entropy Coder (LLEC) to achieve high compression ratio (CR) and low distortion.

Another objective of the present invention is to provide an embedded system that applies the aforesaid image coding method to achieve low-complexity operation and high memory usage during a coding process performed on the image.

In order to achieve the above and other objectives, the present invention provides a image coding method, comprising: step (a) constructing a plurality of edge models with a Forward Discrete Cosine Transform (FDCT) algorithm, wherein the edge models each match at least one dominating coefficient; step (b) creating a plurality of adjustment equations each having at least one adjustment factor, wherein the adjustment equations correspond in quantity to the edge models to allow each of the adjustment equations to match one of the edge models; step (c) capturing an image comprising a plurality of pixels; step (d) selecting the pixels of the image to define a plurality of image blocks; step (e) detecting by block-edge detection (BED) a pattern collectively exhibited by the pixels in the each of the image blocks and then comparing the detected pattern with patterns of the edge models; step (f) changing the pattern of each of the image blocks to the pattern of one of the edge models and adjusting the at least one dominating coefficient of one of the edge models by the at least one adjustment factor of one of the adjustment equations after determining that the pattern of the image block approximates to the pattern of one of the edge models and matches one of the adjustment equations; and step (g) performing a coding process on the edge models each having at least one dominating coefficient by LLEC to generate a compressed image corresponding to the edge models.

In order to achieve the above and other objectives, the present invention provides an embedded system that applies the image coding method.

Compared with the prior art, the present invention provides an image coding method that combines the advantages of BED with the advantages of LLEC such that during a coding process performed on an image the image is detected quickly by BED to match an edge model with a dominating coefficient and adjust the dominating coefficient by adjustment equations, and in consequence image detection inaccuracy arising from sole application of BED as disclosed in the prior art is precluded. Afterward, the edge model with the adjusted dominating coefficient is coded by LLEC to generate a compressed image based on the edge model.

BED is an algorithm intended for simple comparison, whereas LLEC is an algorithm which features low memory usage. Hence, the embedded system compresses the image easily, using BED and LLEC.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
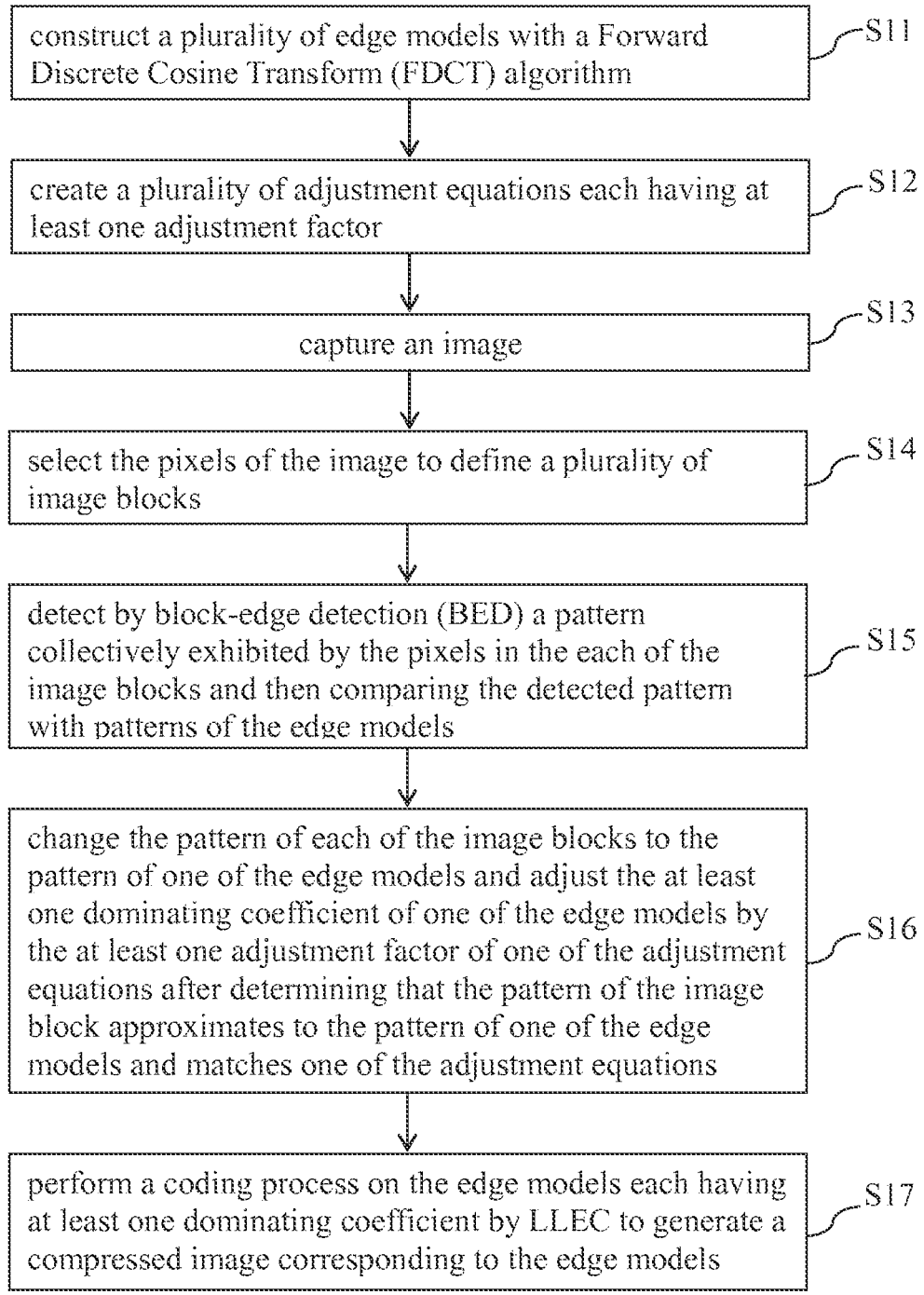
FIG. 1 is a block diagram of the process flow of an image coding method according to an embodiment of the present invention.

Referring to FIG. 1, there is shown a block diagram of the process flow of an image coding method according to an embodiment of the present invention.

The process flow of the image coding method starts with step S11 in which a plurality of edge models is constructed with a Forward Discrete Cosine Transform (FDCT) algorithm. Each of the edge models matches at least one dominating coefficient. The dominating coefficients include positive integers and zero.

Referring to FIGS. 2(a)-(e), for example, the edge models are each defined with a boundary line BL between a black region and a white region, and the included angle θ between the boundary line BL and the x-axis direction. FIG. 2(a) illustrates a no-edge model (hereinafter referred to as the "first edge model".) FIG. 2(b) illustrates a 0°-edge model (hereinafter referred to as the "second edge model".) FIG.

2(c) illustrates a 45°-edge model (hereinafter referred to as the "third edge model".) FIG. 2(d) illustrates a 90°-edge model (hereinafter referred to as the "fourth edge model".) FIG. 2(e) illustrates a 135°-edge model (hereinafter referred to as the "fifth edge model".)

Step S12 involves creating a plurality of adjustment equations, wherein each adjustment equation has at least one adjustment factor. The adjustment equations are expressed mathematically as follows:

$$E_{M,i} = i \times AF$$

where M denotes type of edge model, i denotes dominating coefficient, and AF denotes adjustment factor.

In this embodiment, the adjustment equations correspond in quantity to the edge models. Hence, each of the adjustment equations matches one of the edge models.

For example, when step S11 is exemplified by five edge models, the adjustment equations are further defined as follows:

1) Adjustment Equation for the First Edge Model

If at least one dominating coefficient of the first edge model satisfies the inequality 64>i>0, the at least one dominating coefficient in the adjustment equation will be adjusted with an adjustment factor which is preferably set to 1.15.

After substituting 1.15 for AF, the adjustment equation for the first edge model is rewritten as follows:

$$E_{First\ Edge\ Model,i} = i \times 1.15, 64 > i > 0$$

2) Adjustment Equation for the Second Edge Model

The adjustment equation has three criteria.

The first criterion is that the at least one dominating coefficient of the second edge model satisfies the inequality 64>i>31. If the first criterion is met, the at least one dominating coefficient in the adjustment equation will be adjusted with the adjustment factor 1.15.

The second criterion is that the at least one dominating coefficient of the second edge model falls into the range of 1-4, 6-12, and 22-26. If the second criterion is met, the at least one dominating coefficient in the adjustment equation will be adjusted with the adjustment factor 0.9.

The third criterion is that neither the first criterion nor the second criterion is met. If the third criterion is met, the at least one dominating coefficient in the adjustment equation will not be adjusted, that is, will remain unchanged.

Hence, to cover the aforesaid three criteria, the adjustment equation for the second edge model is rewritten as follows:

$$E_{Second\ Edge\ Model,i} \begin{cases} i \times 1.15, & 64 > i > 31 \\ i \times 0.9, & i = 1 \sim 4, 6 \sim 12, 22 \sim 26 \\ i, & other, \end{cases}$$

3) Adjustment Equation for the Third Edge Model

The adjustment equation has three criteria.

The first criterion is that the at least one dominating coefficient of the third edge model satisfies the inequality 64>i>31. If the first criterion is met, the at least one dominating coefficient in the adjustment equation will be adjusted with an adjustment factor which is preferably set to 1.15.

The second criterion is that the at least one dominating coefficient of the third edge model falls into the range of 1-4 and 14-20. If the second criterion is met, the at least one dominating coefficient in the adjustment equation will be adjusted with an adjustment factor which is preferably set to 0.9.

The third criterion is that neither the first criterion nor the second criterion is met. If the third criterion is met, the at least one dominating coefficient in the adjustment equation will not be adjusted, that is, will remain unchanged.

Hence, to cover the aforesaid three criteria, the adjustment equation for the third edge model is rewritten as follows:

$$E_{Third\ Edge\ Model,i} \begin{cases} i \times 1.15, & 64 > i > 31 \\ i \times 0.9, & i = 1 \sim 4, 14 \sim 20 \\ i, & other, \end{cases}$$

4) Adjustment Equation for the Fourth Edge Model

The adjustment equation has three criteria.

The first criterion is that the at least one dominating coefficient of the fourth edge model satisfies the inequality 64>i>31. If the first criterion is met, the at least one dominating coefficient in the adjustment equation will be adjusted with an adjustment factor which is preferably set to 1.15.

The second criterion is that the at least one dominating coefficient of the fourth edge model falls into the range of 1-4, 6-12, and 22-26. If the second criterion is met, the at least one dominating coefficient in the adjustment equation will be adjusted with an adjustment factor which is preferably set to 0.9.

The third criterion is that neither the first criterion nor the second criterion is met. If the third criterion is met, the at least one dominating coefficient in the adjustment equation will not be adjusted, that is, will remain unchanged.

Hence, to cover the aforesaid three criteria, the adjustment equation for the fourth edge model is rewritten as follows:

$$E_{Fourth\ Edge\ Model,i} \begin{cases} i \times 1.15, & 64 > i > 31 \\ i \times 0.9, & i = 1 \sim 4, 6 \sim 12, 22 \sim 26 \\ i, & other, \end{cases}$$

5) Adjustment Equation for the Fifth Edge Model

The adjustment equation has three criteria.

The first criterion is that the at least one dominating coefficient of the fifth edge model satisfies the inequality 64>i>31. If the first criterion is met, the at least one dominating coefficient in the adjustment equation will be adjusted with an adjustment factor which is preferably set to 1.15.

The second criterion is that the at least one dominating coefficient of the fifth edge model falls into the range of 1-4 and 14-20. If the second criterion is met, the at least one dominating coefficient in the adjustment equation will be adjusted with an adjustment factor which is preferably set to 0.9.

The third criterion is that neither the first criterion nor the second criterion is met. If the third criterion is met, the at least one dominating coefficient in the adjustment equation will not be adjusted, that is, will remain unchanged.

Hence, to cover the aforesaid three criteria, the adjustment equation for the fifth edge model is rewritten as follows:

$$E_{Fifth\ Edge\ Model,i} \begin{cases} i \times 1.15, & 64 > i > 31 \\ i \times 0.9, & i = 1 \sim 4, 14 \sim 20 \\ i, & other, \end{cases}$$

Figure 3:
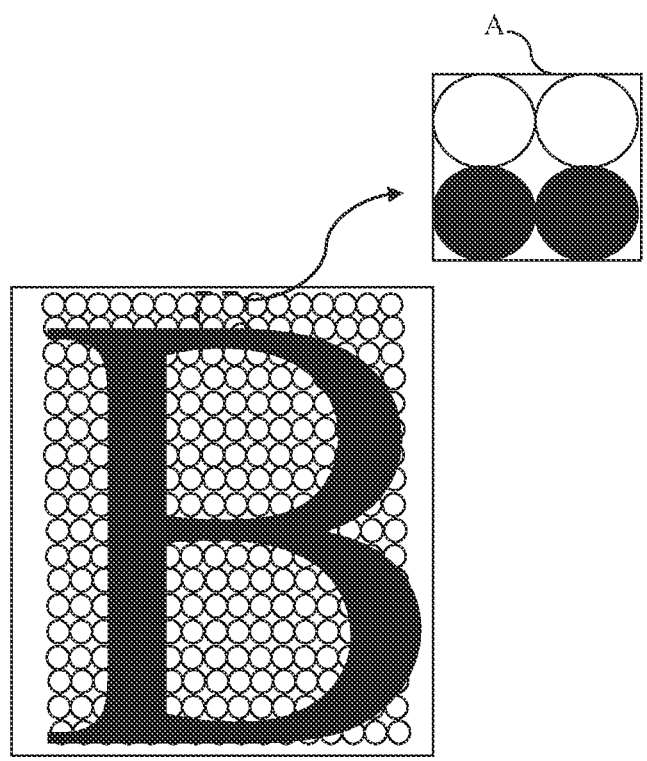
FIG. 3 is a schematic view of an image.

Step S13 involves capturing an image comprising a plurality of pixels. Referring to FIG. 3, the image is exemplified by the upper-case alphabet B and composed of pixels presented in black and pixels presented in white.

Step S14 involves selecting the pixels of the image to define a plurality of image blocks. Referring to FIG. 3, an image block A is demarcated by dashed lines and composed of two pixels presented in black and two pixels presented in white.

Figure 2:
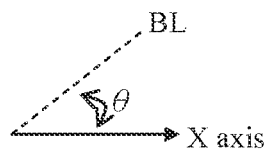
FIGS. 2(a)-(e) are schematic views of edge model.
Figure 2:
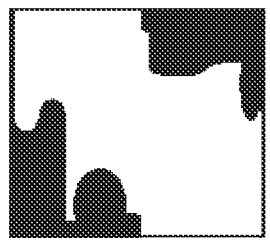
Figure 2:
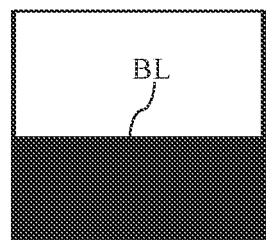
Figure 2:
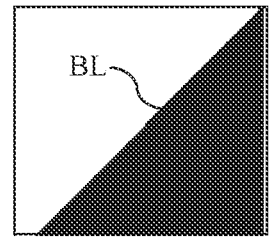
Figure 2:
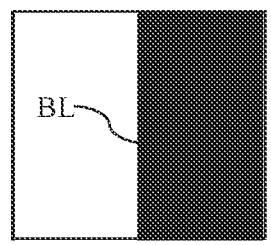
Figure 2:
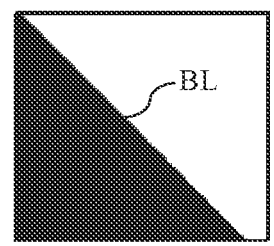

Step S15 involves detecting by block-edge detection (BED) a pattern collectively exhibited by the pixels in the image blocks and then comparing the detected pattern with patterns of the edge models. Referring to FIGS. 2 (a)-(e), the pattern of each of the edge models consists of at least one black region and at least one white region which adjoins the at least one black region. In step S15, the completion of the aforesaid comparison is not only followed by determining whether the pixel-based pattern matches the pattern of one of the edge models, but is also followed by confirming one of the adjustment equations with one of the edge models.

For example, step S15 is also exemplified by the five edge models previously illustrated in step S11. The image blocks are compared with the first edge model, the second edge model, the third edge model, the fourth edge model, and the fifth edge model. Referring to FIG. 3, take the image block A as an example. The black circles and white circles in the image block A denote the pixels in the image block A. The block circles are confined to the lower half of the image block A. After the image block A has been detected with the block-edge detection (BED), a pattern collectively exhibited by the pixels in the image block A is detected and determined, with BED, that the pattern collectively exhibited by the pixels in the image block A approximates to the pattern of the second edge model shown in FIG. 2(b), because the black region in the pattern of the second edge model is also confined to the lower half of the pattern of the second edge model.

Step S16 involves changing the pattern of each of the image blocks to the pattern of one of the edge models and adjusting the at least one dominating coefficient of one of the edge models by the at least one adjustment factor of one of the adjustment equations after determining that the pattern of the image block approximates to the pattern of one of the edge models and matches one of the adjustment equations.

For example, referring to FIG. 3, after the pattern of the image block A has been detected and determined by BED to match the pattern of the second edge model, both a dominating coefficient of the second edge model and the adjustment equation related thereto and created in step S12 can apply to the image block A. For example, a dominating coefficient of 32 applies to the image block A, such that the dominating coefficient 32 is multiplied by the adjustment factor 1.15 to obtain the adjusted dominating coefficient 36.8.

Step S17 involves performing a coding process on the edge models each having at least one dominating coefficient by LLEC to generate a compressed image corresponding to the edge models.

Figure 4:
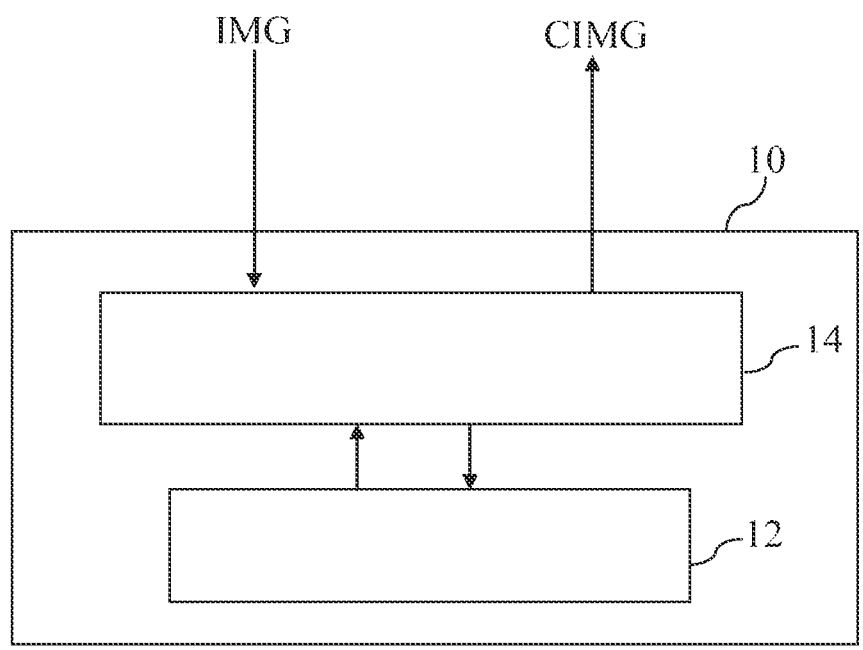
FIG. 4 is a block diagram of an embedded system that applies the image coding method according to an embodiment of the present invention.

Referring to FIG. 4, there is a block diagram of an embedded system that applies the image coding method according to an embodiment of the present invention. As shown in FIG. 4, the embedded system 10 comprises a memory unit 12 and a processing unit 14.

The memory unit 12 stores a program. The program applies the image coding method to the embedded system according to the present invention.

The processing unit 14 is connected to the memory unit 12. After capturing an image IMG, the processing unit 14 executes the program to code the image IMG and generate a compressed image CIMG.

Since the image coding method of the present invention is advantageously characterized by low complexity and low memory usage, the embedded system 10 performs image compression efficiently by means of the image coding method.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An embedded system using an image coding method, the embedded system comprising a processing unit, and the image coding method comprising the steps of:
   constructing a plurality of edge models with a Forward Discrete Cosine Transform (FDCT) algorithm, wherein the edge models each match at least one dominating coefficient;
   creating a plurality of adjustment equations each having at least one adjustment factor, wherein the adjustment equations correspond in quantity to the edge models to allow each of the adjustment equations to match one of the edge models;
   capturing an image comprising a plurality of pixels, by the processing unit;
   selecting the pixels of the image to define a plurality of image blocks, by the processing unit;
   detecting by block-edge detection (BED) a pattern collectively exhibited by the pixels in each of the image blocks, by the processing unit, and then comparing the detected pattern with patterns of the edge models, by the processing unit;
   changing the pattern of each of the image blocks to a pattern of one of the edge models, by the processing unit, and adjusting the at least one dominating coefficient of one of the edge models by the at least one adjustment factor of one of the adjustment equations after determining that the pattern of the image block approximates to the pattern of one of the edge models and matches one of the adjustment equations, by the processing unit; and
   performing a coding process on the edge models each having at least one dominating coefficient by LLEC to generate a compressed image corresponding to the edge models, by the processing unit.

2. The embedded system of claim 1, wherein the edge models comprise a no-edge model, a 0°-edge model, a 45°-edge model, a 90°-edge model, and a 135°-edge model.

3. The embedded system of claim 2, wherein the adjustment equations are expressed mathematically as follows:

$$E_{m\,i} = i \times AF$$

wherein M denotes type of edge model, i denotes dominating coefficient, and AF denotes adjustment factor.

4. The embedded system of claim 3, wherein, if at least one dominating coefficient of the no-edge model satisfies an inequality 64>i>0, the at least one dominating coefficient will be multiplied by an adjustment factor 1.15, wherein i is a positive integer.

5. The embedded system of claim 3, wherein at least one dominating coefficient of the 0°-edge model will be multiplied by an adjustment factor 1.15 if the at least one dominating coefficient satisfies an inequality 64>i>31, and the at least one dominating coefficient of the 0°-edge model will be multiplied by an adjustment factor 0.9 if the at least one dominating coefficient ranges from 1 to 4, from 6 to 12, and from 22 to 26, otherwise the at least one dominating coefficient will not be adjusted, wherein i is a positive integer.

6. The embedded system of claim 5, wherein the at least one dominating coefficient of the 0°-edge model is a positive integer ranging from 1 to 4, from 6 to 12, from 22 to 26.

7. The embedded system of claim 3, wherein at least one dominating coefficient of the 45°-edge model will be multiplied by an adjustment factor 1.15 if the at least one dominating coefficient satisfies an inequality 64>i>31, and the at least one dominating coefficient of the 45°-edge model will be multiplied by an adjustment factor 0.9 if the at least one dominating coefficient ranges from 1 to 4 and from 14 to 20, otherwise the at least one dominating coefficient will not be adjusted, wherein i is a positive integer.

8. The embedded system of claim 7, wherein the at least one dominating coefficient of the 45°-edge model is a positive integer ranging from 1 to 4 and from 14 to 20.

9. The embedded system of claim 3, wherein at least one dominating coefficient of the 90°-edge model will be multiplied by an adjustment factor 1.15 if the at least one dominating coefficient satisfies an inequality 64>i>31, and the at least one dominating coefficient of the 90°-edge model will be multiplied by an adjustment factor 0.9 if the at least one dominating coefficient ranges from 1 to 4, from 6 to 12, and from 22 to 26, otherwise the at least one dominating coefficient will not be adjusted, wherein i is a positive integer.

10. The embedded system of claim 9, wherein the at least one dominating coefficient of the 90°-edge model is a positive integer ranging from 1 to 4, from 6 to 12, and from 22 to 26.

11. The embedded system of claim 3, wherein at least one dominating coefficient of the 135°-edge model will be multiplied by an adjustment factor 1.15 if the at least one dominating coefficient satisfies an inequality 64>i>31, the at least one dominating coefficient will be multiplied by an adjustment factor 0.9 if the at least one dominating coefficient ranges from 1 to 4 and from 14 to 20, otherwise the at least one dominating coefficient will not be adjusted.

12. The embedded system of claim 11, wherein the at least one dominating coefficient of the 135°-edge model is a positive integer ranging from 1 to 4 and from 14 to 20.

* * * * *